US009346330B2

(12) United States Patent
Musgrave et al.

(10) Patent No.: US 9,346,330 B2
(45) Date of Patent: May 24, 2016

(54) SYSTEM AND METHOD USING A PRESSURE REDUCTION VALVE

(75) Inventors: Tim Musgrave, San Antonio, TX (US); Frank Sonzala, San Antonio, TX (US); Kevin Hennig, Corpus Christi, TX (US)

(73) Assignee: Equalaire Systems, Inc., Corpus Christi, TX (US)

( * ) Notice: Subject to any disclaimer, the term of this patent is extended or adjusted under 35 U.S.C. 154(b) by 192 days.

(21) Appl. No.: 14/116,010

(22) PCT Filed: Jun. 7, 2012

(86) PCT No.: PCT/US2012/041402
§ 371 (c)(1),
(2), (4) Date: Feb. 26, 2014

(87) PCT Pub. No.: WO2012/170721
PCT Pub. Date: Dec. 13, 2012

(65) Prior Publication Data
US 2014/0196812 A1    Jul. 17, 2014

Related U.S. Application Data

(60) Provisional application No. 61/494,327, filed on Jun. 7, 2011.

(51) Int. Cl.
*B60C 23/10* (2006.01)
*B60C 23/00* (2006.01)
*B60S 5/04* (2006.01)

(52) U.S. Cl.
CPC ............... *B60C 23/003* (2013.01); *B60S 5/043* (2013.01)

(58) Field of Classification Search
CPC .. B60C 23/001; B60C 23/002; B60C 23/003; B60C 23/004; B60C 23/02; B60C 23/0486; B60C 23/0488; B60C 23/0489; B60S 5/04; B60S 5/043; B60S 5/046
USPC .......... 152/415, 416, 417, 427; 137/223, 224, 137/226, 228, 230
See application file for complete search history.

(56) References Cited

U.S. PATENT DOCUMENTS

| | | | | |
|---|---|---|---|---|
| 3,848,652 A * | 11/1974 | Hughes | ..................... | B60C 5/16 152/415 |
| 4,641,698 A * | 2/1987 | Bitonti | .................. | B60C 23/003 137/223 |
| 4,917,163 A * | 4/1990 | Schultz | ................. | B60C 23/003 152/415 |
| 5,287,906 A * | 2/1994 | Stech | .................... | B60C 23/007 141/38 |
| 6,167,900 B1 | 1/2001 | Laird | | |

(Continued)

OTHER PUBLICATIONS

International Search Report and Written Opinion issued in PCT/US2012/041402 dated Aug. 10, 2012 (9 pages).

(Continued)

*Primary Examiner* — John Walters
(74) *Attorney, Agent, or Firm* — The Pizarro Firm; Derrick A. Pizarro

(57) ABSTRACT

An automatic tire inflation system or wheel end assembly may be provided with a pressure reduction valve to allow rapid deflation of a tire. A method of rapidly reducing tire pressure may include use of a pressure reduction valve.

8 Claims, 11 Drawing Sheets

(56) References Cited

U.S. PATENT DOCUMENTS

| | | | |
|---|---|---|---|
| 6,425,427 B1 * | 7/2002 | Stech | B60C 23/003 152/415 |
| 6,968,882 B2 * | 11/2005 | Ingram | B60C 23/003 152/417 |
| 7,306,020 B2 * | 12/2007 | Beverly | B60C 23/003 152/415 |
| 8,567,241 B2 | 10/2013 | Falkenborg et al. | |
| 2004/0173296 A1 | 9/2004 | White et al. | |
| 2005/0000615 A1 | 1/2005 | Ingram | |
| 2005/0194079 A1 | 9/2005 | Hennig | |
| 2013/0269849 A1 | 10/2013 | Hennig et al. | |
| 2013/0276902 A1 | 10/2013 | Medley et al. | |
| 2013/0282232 A1 | 10/2013 | Medley et al. | |
| 2013/0289823 A1 | 10/2013 | Boss et al. | |

OTHER PUBLICATIONS

International Preliminary Report on Patentability issued in PCT/US2012/041402 dated Dec. 10, 2013 (5 pages).

* cited by examiner

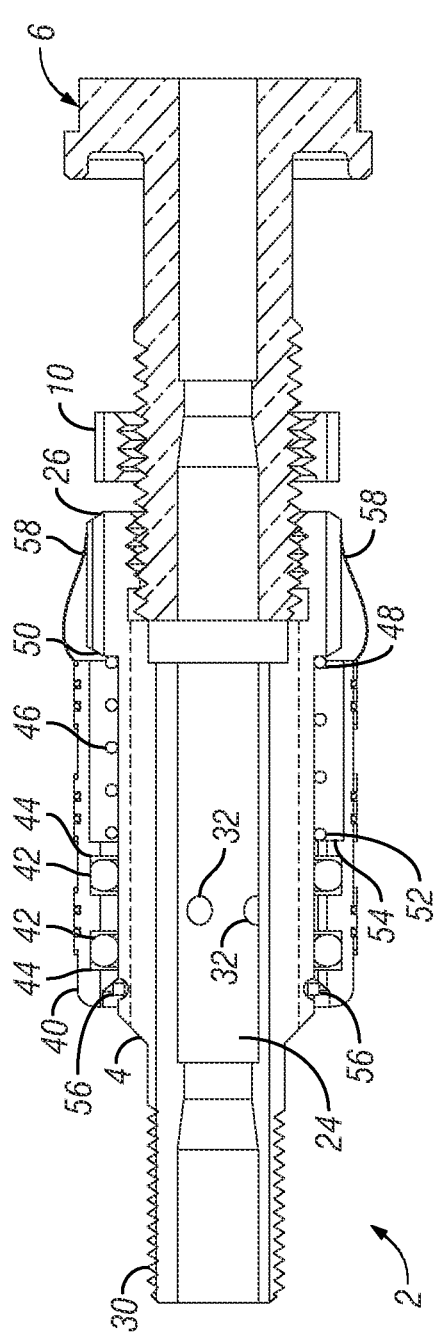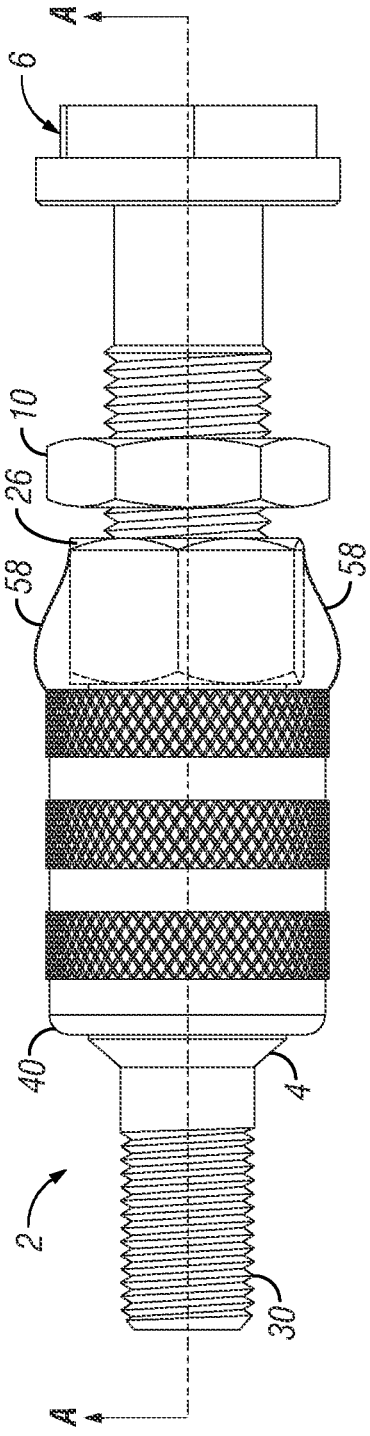

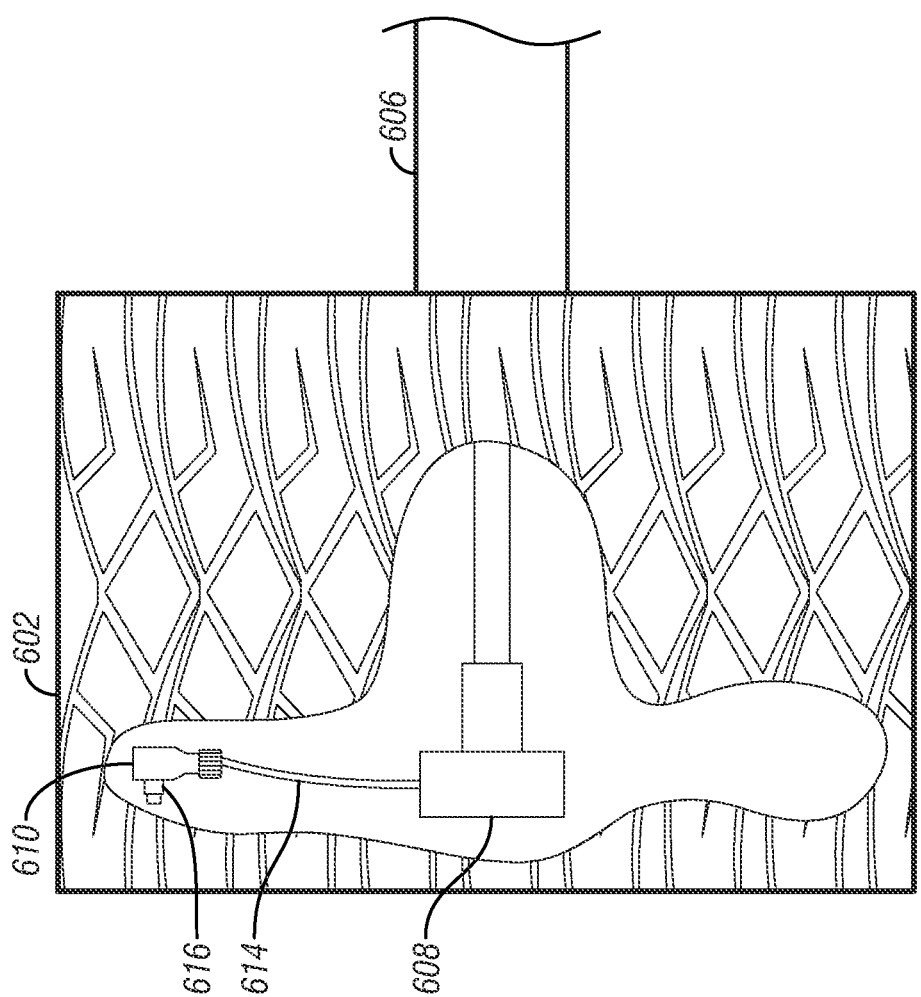

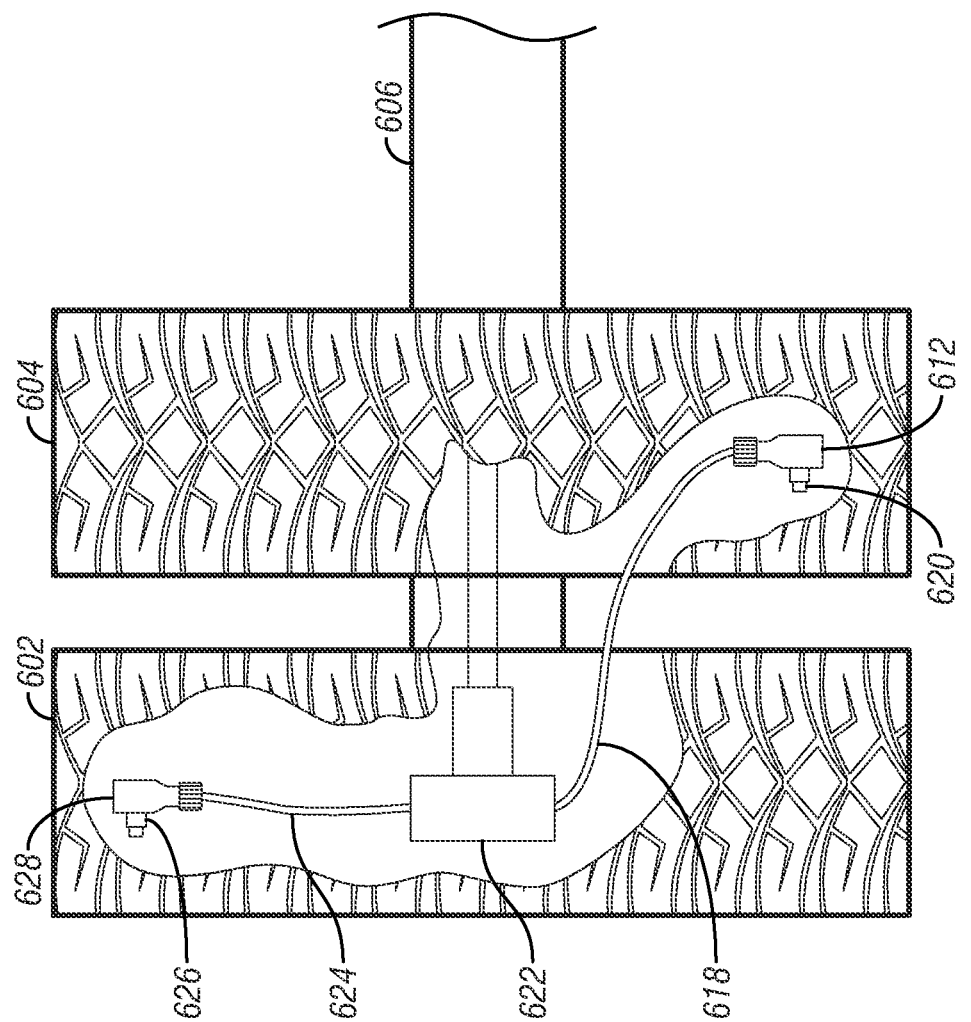

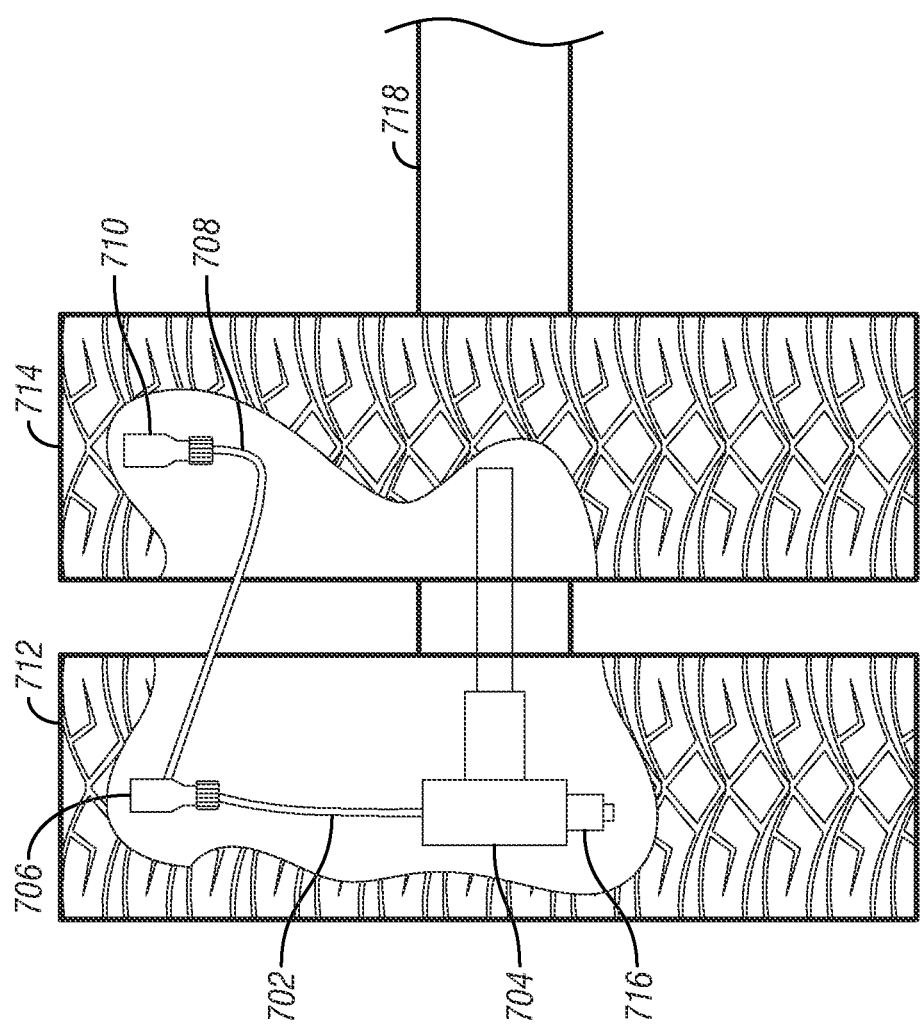

SYSTEM AND METHOD USING A PRESSURE REDUCTION VALVE

CROSS-REFERENCE TO RELATED APPLICATIONS

This application claims priority to U.S. Provisional Patent Application No. 61/494,327 filed Jun. 7, 2011, which is incorporated herein by reference.

FIELD

This application relates generally to vehicle automatic tire inflation systems.

BACKGROUND

Automatic tire inflation systems may be used to control vehicle tire pressure by adding air to the vehicle's tires. Automatic tire inflation systems may provide pressurized air from a pressurized air source to the vehicle's tires to maintain tire pressure at a desired pressure level whether the tires are stationary and rotating. Automatic tire inflation systems may use a variety of regulators, air conduits and rotary air connections to provide pressurized air to the tires. Automatic tire inflation systems may also use one or more valves to control the direction, speed and volume of air flow. There exists a need for a valve arrangement and method to better control air flow, and to rapidly reduce tire pressure.

SUMMARY

In some embodiments, a wheel end assembly may comprise a hubcap mounted to a wheel rotatable on an axle on a vehicle, an air pressure supply positioned inside the axle and connected to a pressure source on the vehicle, a rotary union mounted to the hubcap and in fluid communication with the air pressure supply, a valve stem mounted to the wheel, the valve stem including a valve and an auxiliary port, an air hose connected at a first end to the rotary union and at a second end to the valve stem so as to allow air to flow from the air pressure supply through the air hose to the valve stem, and a manually-operable, electrically-operable or automatic pressure reduction valve connected to the auxiliary port. The pressure reduction valve may comprise one of a metering, timed or deceleration valve, or other suitable valve allowing for relatively high air flow.

In some embodiments, a wheel end assembly may comprise a hubcap mounted to a wheel rotatable on an axle on a vehicle, an air pressure supply positioned inside the axle and connected to a pressure source on the vehicle, a rotary union mounted to the hubcap and in fluid communication with the air pressure supply, a valve stem mounted to the wheel, the valve stem including a valve, an air hose connected at a first end to the rotary union and at a second end to the valve stem so as to allow air to flow from the air pressure supply through the air hose to the valve stem, and a pressure reduction valve connected to the rotary union.

In some embodiments, a wheel end assembly may comprise a hubcap mounted to a wheel rotatable on an axle on a vehicle, an air pressure supply positioned inside the axle and connected to a pressure source on the vehicle, a rotary union mounted to the hubcap and in fluid communication with the air pressure supply, a first valve stem mounted to the wheel, the valve stem comprising a first valve, a second valve stem mounted to the wheel, the second valve stem including a second valve and an auxiliary port, an air hose connected at a first end to the rotary union and at a second end to the first valve stem so as to allow air to flow from the air pressure supply through the air hose to the valve stem, and a pressure reduction valve connected to the auxiliary port of the second valve stem.

In some embodiments, a vehicle may comprise one or more tires, an automatic tire inflation system configured to automatically inflate the one or more tires to a desired pressure upon activation, and a pressure reduction valve configured to rapidly release air from the one or more tires. A method of controlling air pressure in the vehicle tires may include, while the automatic tire inflation system is de-activated, opening a pressure reduction valve to release air from the one or more tires; and activating the automatic tire inflation system to inflate the one or more tires to a desired air pressure.

In various embodiments, a pressure reduction valve may comprise one of a metering, timed or deceleration valve, or other suitable valve, such as an electric valve or automatic valve, allowing for relatively high air flow to allow rapid tire deflation.

BRIEF DESCRIPTION OF THE DRAWINGS

FIGS. 5A and 5B illustrate another embodiment of a valve including an auxiliary port and a sleeve in a closed position covering the auxiliary port.

FIG. 6A illustrates an embodiment of an axle with single tires wherein each wheel mounting a tire is provided with a valve having an auxiliary port and a pressure reduction valve.

FIG. 6B illustrates an embodiment of an axle with dual tires wherein each wheel mounting a tire is provided with a valve having an auxiliary port and a pressure reduction valve.

FIG. 7 illustrates an embodiment of an axle with dual tires wherein a first air hose is connected between a first air connection, which contains a pressure reduction valve, and a valve, and a second air hose is connected between the valve and a second valve.

DETAILED DESCRIPTION

Figure 1:
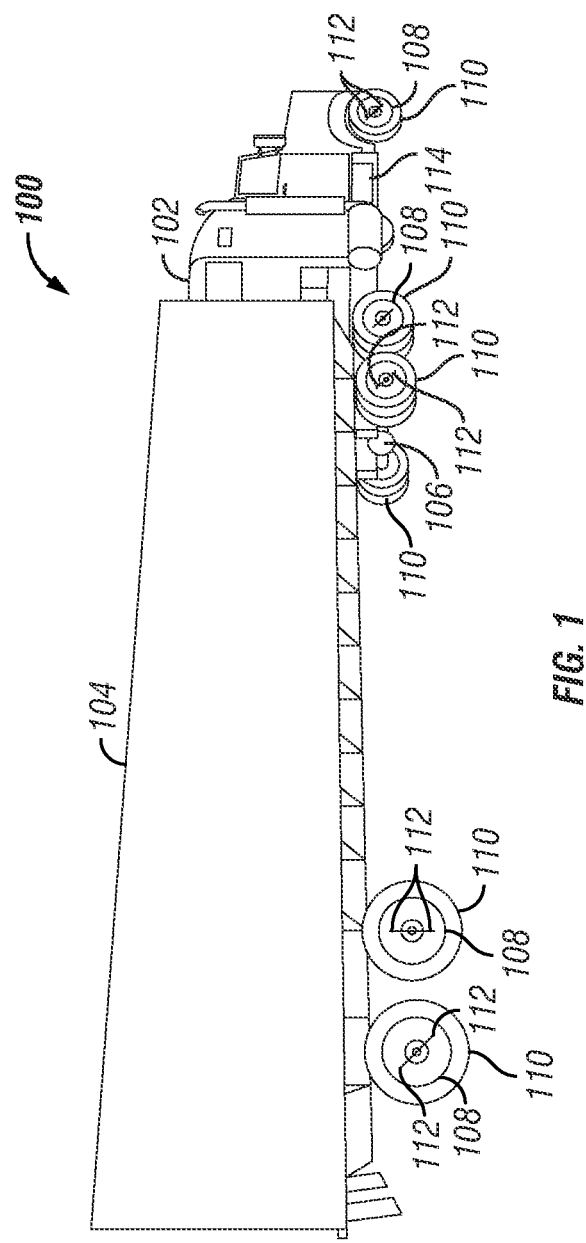
FIG. 1 illustrates an embodiment of a vehicle having an automatic tire inflation system.

As may be seen in FIG. 1, a vehicle 100 may comprise a truck 102 and a trailer 104. The truck 102 may include one or more drive axles 106 as part of the vehicle's powertrain. The truck 102 may further include a steer axle (not shown in detail) having pivotable spindles that may provide steering capability for the vehicle 100. The trailer 104 may include one or more fixed axles (not shown). Each axle may have one or more wheels 108 mounted thereto. A pneumatic tire 110 may be mounted to each wheel 108.

The vehicle 100 may be provided with an automatic tire inflation system (such as is shown in more detail in FIGS. 2-4 and 6A-9) that may use pressurized air from the vehicle's air brake system or some other source of pressurized air to maintain the tires at a desired air pressure. The automatic tire inflation system may be used to control air pressure in one or more of the tires 110 mounted to the steer (not shown), drive 106 and/or trailer axles (not shown). The automatic tire inflation system may include one or more air hoses 112 in fluid communication with each tire 110 for communicating air from the air pressure source to and from one or more of the tires 110.

Figure 2:
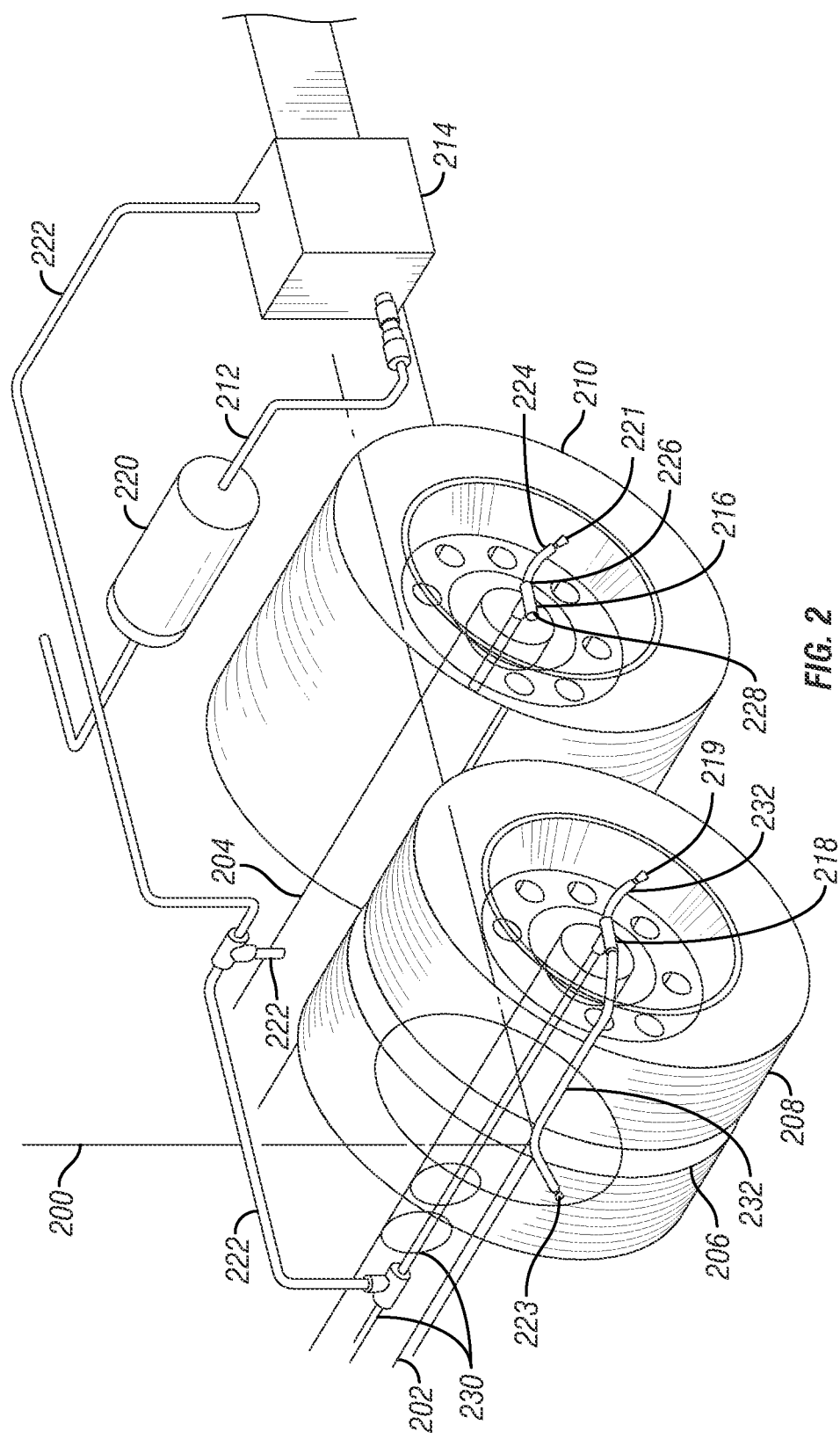
FIG. 2 illustrates multiple detailed embodiments of an automatic tire inflation system.

FIG. 2 illustrates in more detail multiple embodiments of an automatic tire inflation system. A trailer 200 may include two axles 202, 204. Some trailers 200 may have dual tires 206, 208 mounted at each end of the axles 202, 204, as may be seen with respect to axle 202. Other trailers 200 may have a single tire 210, such as a super-single tire or a wide-base tire, mounted at each end of the axles 202, 204, as may be seen with respect to axle 204. The automatic tire inflation system may generally include a pressure regulator 214, which may be mounted in a control box, and one or more rotary air connections or rotary unions 216, 218 mounted in or near the axle ends as described in more detail below. The pressure regulator 214 may receive pressurized air from an air pressure source 220 through a conduit 212. The air pressure source 220 may comprise, for example, a vehicle air brake system air supply or a step-up or booster pump. The pressure regulator 214 may control, or increase or reduce the air pressure from the air pressure source 220 to an air pressure level suitable for inflating the tires 206, 208, 210, such as, for example, 110 psi. Pressurized air may flow from the pressure regulator 214 through conduit 222 to the axles 202, 204. From there, the air may flow through lines 230 to rotary connections 216, 218 to hoses 224, 232 to valves 219, 221, 223 connected to tires 208, 210, 206, respectively.

The axles 202, 204 may be wholly or partially solid or hollow, and may be configured in a variety of ways. For illustration purposes only, axles 202, 204 are hollow. For example, in some embodiments, an axle may comprise a solid beam having a spindle attached to each end (not shown). The axle spindles may be configured to allow mounting of wheel bearings upon which a hub may be rotatably mounted (not shown). In other embodiments, an axle may comprise a hollow tube having a spindle attached to each end. The spindles may be hollow, resulting in a hollow axle that is open at each end, as may be seen in the embodiment of FIGS. 3-4. Alternatively, the spindles may be wholly or partially solid, resulting in a hollow axle that is closed at each end (not shown).

Figure 3:
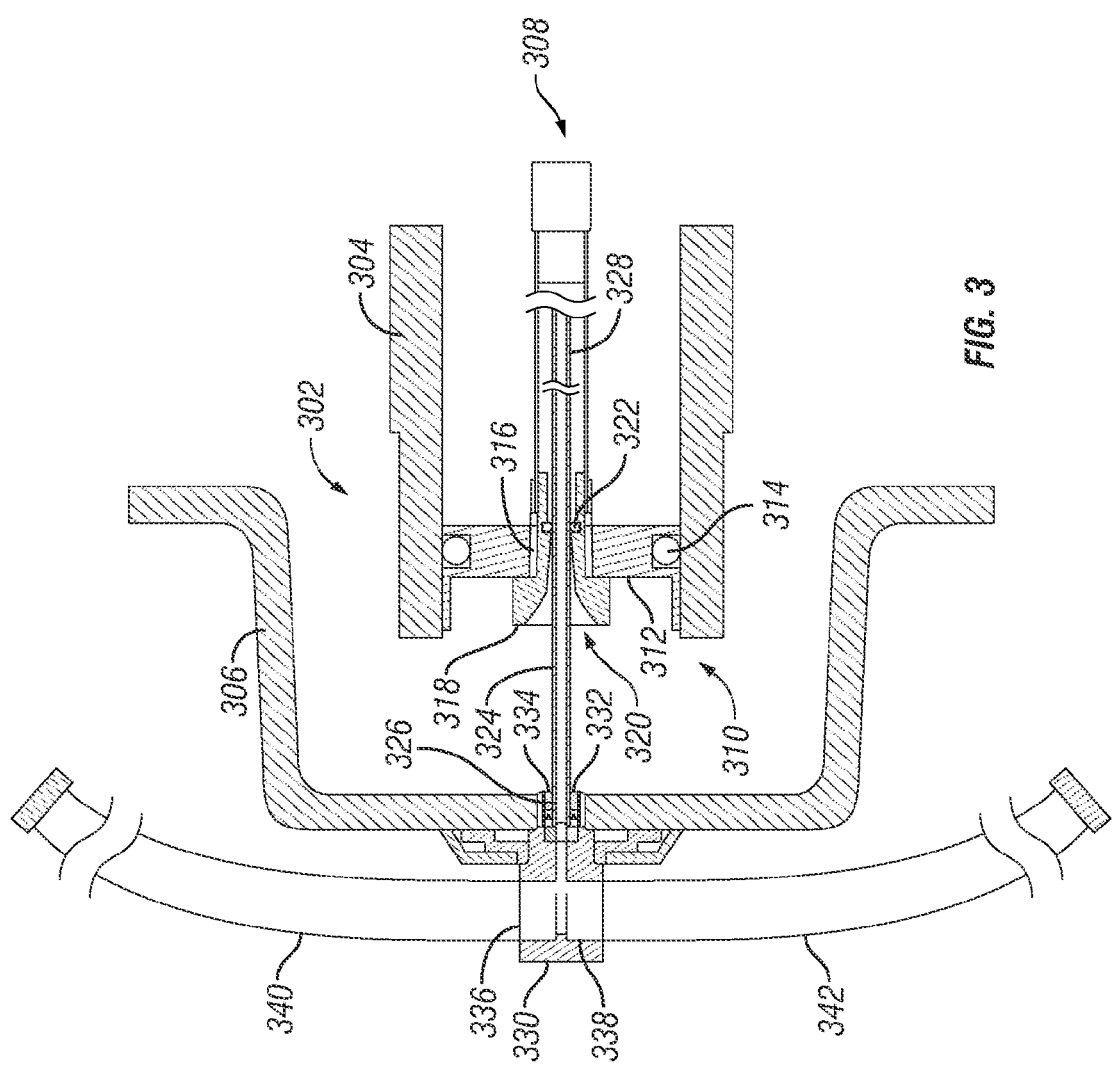
FIG. 3 illustrates an embodiment of a rotary air connection.

Referring now to FIG. 3, the reference numeral 302 generally indicates a rotary air connection for supplying air from an air supply 308, such as air pressure source 220 in FIG. 2, on a truck trailer (not shown) in an automatic tire inflation system for a vehicle to the rotating tires (not shown). The numeral 304 generally indicates one axle or spindle of a trailer having one or more axles 304 with wheels (not shown) having one or more tires at one end, a hub cap 306 at each end of the axle 304 for retaining lubricant in the wheel bearings and an air supply 308 either directly in the axle 304 (for example, a sealed hollow axle as shown in axle 204 of FIG. 2), or through an interior conduit (for example, line 230 as shown in axle 202 of FIG. 2) in the inside of the axle 304, for supplying air to the rotary air connection 302 through the inside of the axle 304, such as, for example, described in U.S. Pat. Nos. 5,584,949, 5,769,979, 6,182,727, 6,145,559, and 6,892,778 and U.S. Pat. Pub. 2009/0283190, the disclosures of which are wholly incorporated herein by reference.

A pneumatic rotary union generally indicated by the reference numeral 310 may be supported and positioned in the center of each end of the axle 304, such as in an axle plug 312, such as, for example, the axle plug disclosed in U.S. Pat. Nos. 6,131,631, 5,584,949, 5,769,979, 6,394,556, 6,892,778, 6,938,658, 6,325,124, and 7,273,082, some embodiments of axle plug 312 which may seatingly engage the interior of the axle 304 by a seal 314 if air is injected directly into the inside of the axle 304, and in turn may be sealed from the exterior of the rotary union 310 by a sealed connection 316. Other axle plugs 312 may not seal axle 304.

Referring still to FIG. 3, the union 310 may have a first stationary part 318 having a passageway 320 therethrough. The passageway 320 may be in communication with the air supply 308 injected directly into the interior of the axle 304 or to a supply conduit (not shown) as described above. A first resilient stationary rotary seal 322 may be supported in the passageway 320 and may encircle the passageway 320. The rotary seal 322 may be any suitable seal and any suitable material, for example, a lip seal of NITRILE is satisfactory; although a conventional O-ring may be used.

The rotary union 310 may include a second rotatable part including an elongate rigid tubular member 324, preferably metal, having a first end 326 and a second end 328. The second end 328 may be coaxially extendible through and may be longitudinally and rotationally movable in the passageway 320, may sealably engage the rotary seal 322, and may be in communication with the air supply 308. An air connection 330 or tee body may be mounted or built into the hub cap 306 for connection to the tire or tires at the end of the axle 304. The first end 326 of the tubular member 324 may be sealably connected to the air connection or tee body 330 on the hub cap 306 through a seal 332. The seal 332 may be of any suitable dynamic seal allowing axial and rotational movement of the end 326, such as a lip seal or O-ring seal, and may be held in place by the telescope cap 334. As may be seen in the embodiment of FIG. 4, and as may be used in some embodiments of automatic tire inflation systems, a valve core 408, such as, for example, a Schrader valve core, may be mounted in the tee body 330 to allow one-way air flow from the tubular member 324 through the tee body 330. In such embodiments, check valves may be removed from air hoses 340, 342 (as shown in FIG. 3) and other places along the path of fluid communication between the tee body 330 and the vehicle tires, thus allowing air to flow unchecked to and from the tee body 330 and vehicle tires. In yet other embodiments of automatic tire inflation systems, air may flow unchecked to and from the vehicle tires and the pressure regulator 214 or source of pressurized air 220. In such embodiments, a pressure reduction valve may be provided in fluid communication with the air at some point along the air conduits between the source of pressurized air 220 and the vehicle tires. For example, a pressure reduction valve may be placed at the pressure regulator 214 or automatic tire inflation system control box to allow a driver to release air from the vehicle tires connected to the automatic tire inflation system.

In the embodiment of FIG. 3, the air connection 330 may have two ports 336, 338. Air hoses 340, 342 may be connected to ports 336, 338, respectively, so as to allow fluid communication of the air connection 330 with the tires.

In operation, with reference to FIG. 3, air from the air supply 308 may be supplied through the stationary part 318 of the rotary union 310. Air may flow through the tube 324 to the air connection 330. Air may flow from the air connection 330 through one or more hoses 340, 342, each attached at one end to a port 336, 338, and at the other end to a tire (not shown). Air may flow through the hose 340, 342 into the tire, thus pressurizing the tire. If the tire pressure increases beyond the automatic tire inflation system's target pressure, then the automatic tire inflation system will not inflate the tire. The hub cap 306 may rotate with the wheels and relative to the axle 304 and/or tubular member 324. The tubular member 324 may be movable and rotatable in the seals 322, 332, compensating for any misalignment between the rotatable hub cap 306 and the first stationary part 318 of the pneumatic rotary union 310. The above description is generally disclosed in U.S. Pat. Nos. 5,769,979 and 6,698,482, the disclosures of which are wholly incorporated herein by reference. The present apparatuses, systems and methods may also function with other types of automatic tire inflation systems and rotary connections, such as, for example, those offered by companies such as Hendrickson, Fleet Air, Stemco, Airgo, Col-Ven/Vigia, and other manufacturers, or otherwise disclosed in U.S. Pat. Pub. Nos. 2005/0133134, 2008/0185086, 2009/0283190, 2012/0024445, and 2012/0059546, and U.S. Pat. Nos. 6,105,645, 6,244,316, 6,325,123, 6,585,019, 6,698, 482, 6,968,882, 7,185,688, 7,207,365, 7,273,082, 7,302,980 (the disclosures of each of which are wholly incorporated herein by reference).

Figure 9:
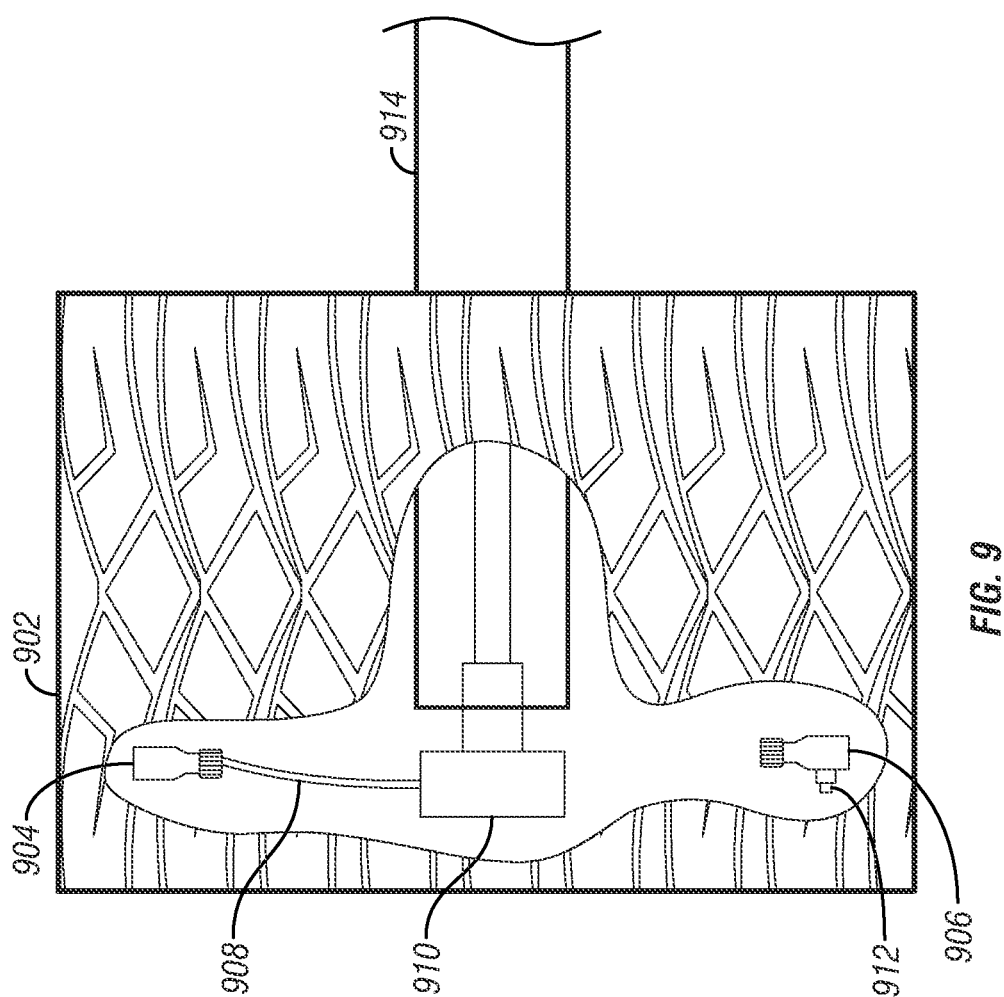
FIG. 9 illustrates an embodiment of an axle with a single tire wherein the tire includes two valves, one standard valve stem and a second valve stem having an auxiliary port and a pressure reduction valve.

Often, as in FIGS. 2 and 9, however, heavy trucks and trailers use a single tire, such as a super-single tire or a wide-base tire, in place of dual tires, i.e., each axle has mounted two tires. Thus, a two-axle trailer may have only four single tires instead of eight tires of the same width. Single tires may include those manufactured, for example, by Michelin, Toyo, Goodyear, Bridgestone and other tire manufacturers. The tire pressure in a wide-base tire may be more affected by temperature, barometric pressure altitude, and other factors than a typical-width tire. Tire pressure may vary according to a number of factors, such as load, altitude and temperature. A tire's pressure may be higher when bearing heavier loads. In another example, a stationary tire's temperature may rise as night turns to day, thus raising the tire pressure. Likewise, a tire's temperature may rise during use, thus raising the tire pressure. Or, a tire's pressure may rise as atmospheric conditions change, such as when low-pressure weather systems form. A tire's pressure may also rise when traveling from a lower altitude to a higher altitude. Thus, tire pressure may be greater than the automatic tire inflation system's target pressure, often many times throughout the day. Conversely, a tire's pressure may decrease when traveling from a higher altitude to a lower altitude, or as day turns to night, or as the tire stops moving. When the tire pressure drops below the automatic tire inflation system's target pressure, then the automatic tire inflation system may pressurize the tire. When the tire pressure rises above the automatic tire inflation system's target pressure, then the automatic tire inflation system will not pressurize the tire. However, the tire may retain the increased tire pressure, leading to premature and uneven tire wear. Dual-tire arrangements may suffer from the same overpressurization phenomenon. Furthermore, different tires on the same trailer or vehicle may be affected differently by overpressurization.

For example, a trailer may be sitting in the sun at a shipping dock waiting to be hauled by a truck. Either before or after connecting the truck to the trailer, a driver may conduct a pre-trip check of tire conditions, including air pressure. Rather than try to determine whether a tire has too much pressure, a pressure reduction valve, such as those shown in FIGS. 4 and 6A-9 may be used to quickly reduce air pressure to at or below the automatic tire inflation system's target pressure. It may not matter that the air pressure is reduced to below the automatic tire inflation system's target pressure, because when the truck engine starts running, and the automatic tire inflation system is activated, the automatic tire inflation system will detect the below-target pressure and automatically pressurize under-inflated tires. In some such systems, a low-pressure warning light may illuminate to indicate under-pressurization, and remain illuminated until the system inflates the tires to the desired pressure.

Thus, a method of using a pressure reduction valve may include, in some embodiments, deflating vehicle tires while the automatic tire inflation system is deactivated. A driver may, for example, open a pressure reduction valve for approximately 10 seconds to release approximately 10 psi or more of air pressure from the tires. A driver may open the pressure reduction valve for other suitable durations, or until the driver is reasonably confident that the tires are under-inflated or that the air pressure has been reduced by a desired amount. If the pressure reduction valve comprises a manually-operated valve such as a push-button or "slide-open" valve, the driver may simply hold the valve open until the tires are believed sufficiently deflated. In other embodiments, if the pressure reduction valve comprises a metered or deceleration valve, the driver may manually open the valve, and rely on the valve to automatically close after a certain period of time, or at a certain pressure. In yet other embodiments, if the pressure reduction valve comprises an electrically-operated valve, the driver may electrically open and close the valve, such as by pressing an in-cab button in wired or wireless communication with the valve. A driver may then activate the tire inflation system, such as may occur automatically when the driver starts the vehicle engine. The tire inflation system may then detect that the tires are underpressurized, and then operate to inflate the tires to a desired air pressure.

Figure 4:
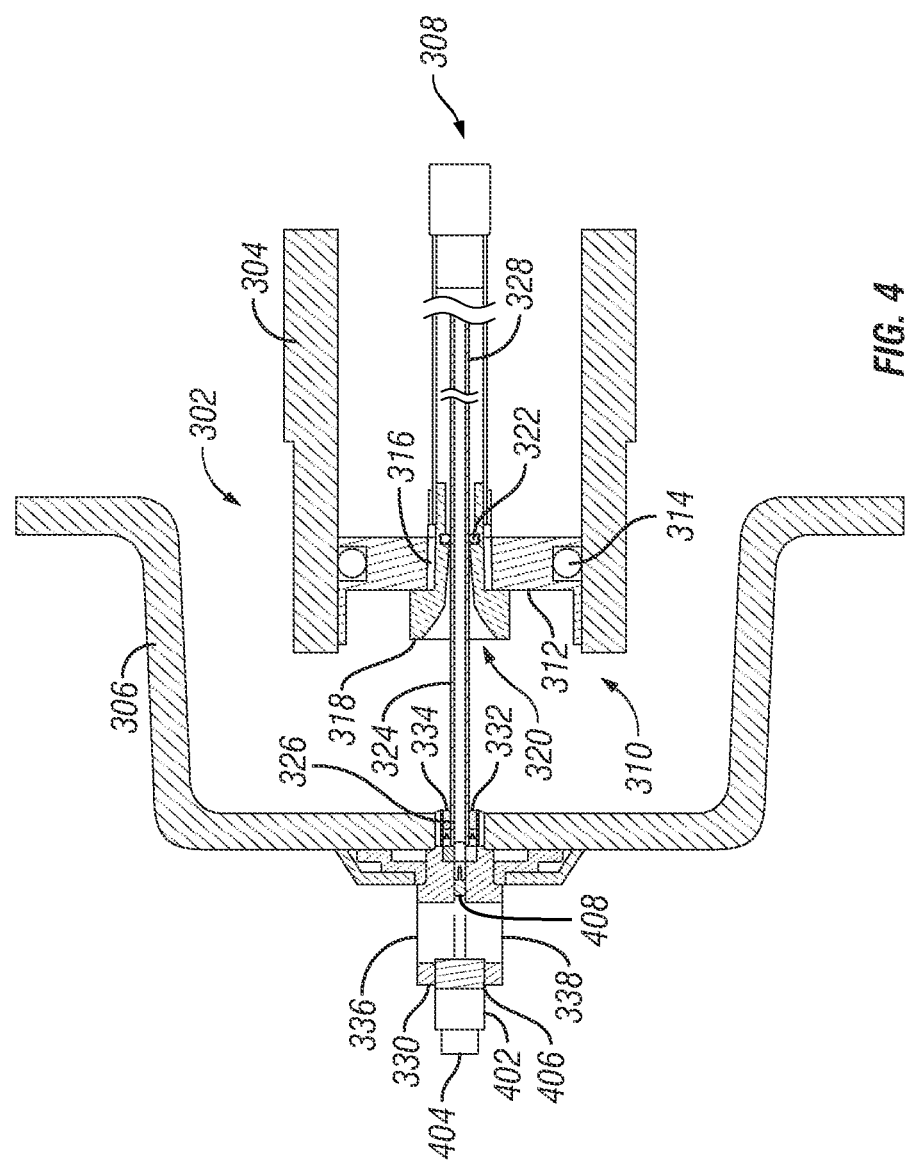
FIG. 4 illustrates an embodiment of a rotary air connection including a pressure reduction valve.

As shown in FIG. 4, a pressure reduction valve 402 may be provided to de-pressurize the tires, whether in dual-tire or single-tire arrangements. The pressure reduction valve 402 may, in some embodiments, comprise a push button 404 for manual activation. The manual pressure reduction valve 402 may be a normally closed valve that may be opened to reduce tire pressure from a tire (not shown). The valve 402 may be of the type that remains open only for so long as the button 404 is depressed. In other embodiments, the valve 402 may be a deceleration, metering or timed valve that remains open for a period of time before automatically shutting off. A manual pressure reduction valve 402 may allow a much higher volume of air to pass compared to a standard valve stem having, for example, a Schrader® or other valve core typically used for heavy vehicle tires. For example, a standard valve core may allow deflation of a tire by approximately 10 psi in approximately 30 seconds or substantially more time, whereas a manual pressure reduction valve 402 as described herein may allow deflation of a tire by approximately 10 psi in approximately half of that time or substantially less time, e.g., approximately 10 seconds. Thus, a manual pressure reduction valve 402 used in connection with an automatic tire inflation system as described herein may permit a driver to relatively quickly reduce air pressure in possibly over-inflated tires such that the automatic tire inflation system may increase pressure in the tires to a desired pressure. A driver need not know whether any tires contain excess air; regardless, a driver may simply depress or activate a pressure reduction valve to rapidly deflate the tires, e.g., in 10 seconds or less, and rely on the vehicle's automatic tire inflation system to properly pressurize the tires.

Although the manual pressure reduction valves 402, 616, 620, 626, 716, 820, 822, 912 shown in the attached figures are depicted as "push-button"-type valves, valves 402, 616, 620, 626, 716, 820, 822, 912, and all other manual pressure reduction valves described and claimed herein may be any suitable type of pressure reduction valve, such as, for example, a "slide-open"-type valve (for example, as shown in FIGS. 5A and 5B), a hand lever operated valve, a push-button valve, a petcock-type valve, a ball valve, a toggle lever operated valve, an electric operated valve (e.g., to allow remote operation), or other automatic valve.

A manual pressure reduction valve 402 may also be used for single-tire configurations. In the embodiment of FIG. 2, for example, for truck trailers having a single tire 210 in place of dual tires, a single air hose 224 may be used to connect the single tire 210 to a port 226 of the rotary union 216. A manual pressure reduction valve 402 may connected to port 228.

In other embodiments, such as illustrated in FIG. 4, for dual-tire applications requiring that two air hoses (as seen in connection with tires 206 and 208 in FIG. 2) be attached to ports 336 and 338, a third port 406 may be provided in air connection 330 so as to allow connection of a manual pressure reduction valve 402. Ports 336, 338 and 406 may be oriented in any number of suitable ways, for example, so as to balance the mass of various attachments, or to accommodate a variety of attachment and hose shapes and sizes.

Figure 5:
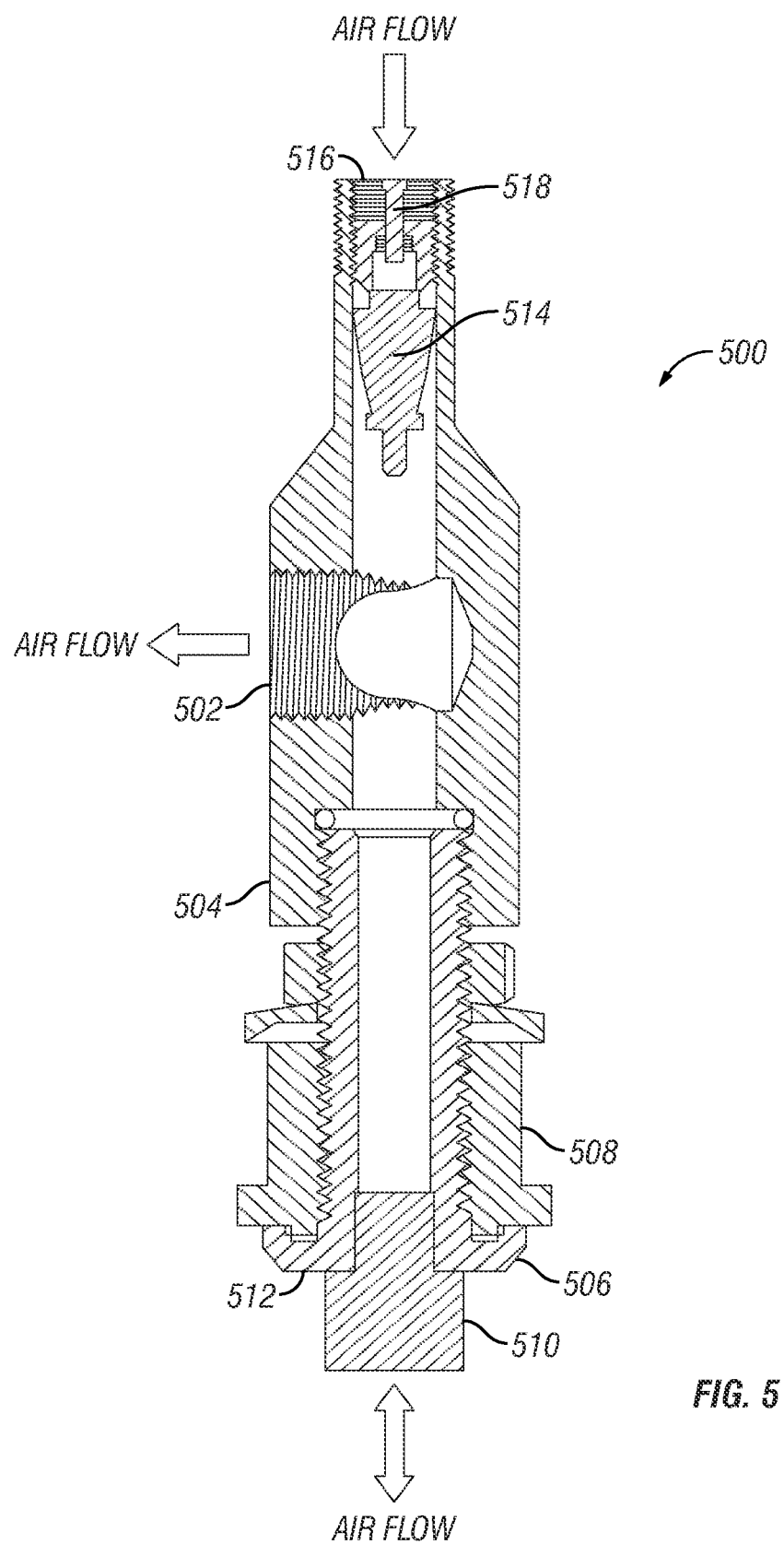
FIG. 5 illustrates an embodiment of a valve including an auxiliary port.

In yet other embodiments, such as may be seen in FIG. 5, a valve stem 500 having an auxiliary port 502, such as that disclosed in U.S. Prov. Pat. App. 61/376,144 and PCT/US2011/048760, the disclosures of which are wholly incorporated herein by reference, may be used in lieu of a wheel's standard valve stem. For example, as may be seen in the embodiment of FIG. 5, a tire valve stem 500 may comprise a stem portion 504 and a seating portion 506. The seating portion 506 may comprise a rubber seal 508 configured to allow snap-in seating in a hole in a tire rim. An air filter 510 may be mounted to the base 512 of the seating portion 506. A valve core 514, such as a Schrader valve core, may be removably mounted within the stem portion 504. The valve core 514 may comprise a one-way valve that permits air to flow through in one direction but not the other. An air hose (not shown) connected to the primary port 516 of the valve stem 500 may be provided with a post 518 to hold open the valve core 514 to allow air to flow out of the valve stem 500 when the air hose is attached. The stem portion 504 may be provided with one or more auxiliary ports 502. A manual reduction valve (not shown) may be mounted to the auxiliary port 502 of the valve stem 500 so as to allow a driver to reduce tire pressure as described above instead of mounting a manual reduction valve 402 to the air connection 330, as shown in FIG. 4. Use of a valve stem 500 having an auxiliary port 502, with a manual reduction valve mounted to the auxiliary port 502, may avoid the need for a manual reduction valve 402 connected to air connection 330.

In other embodiments, a high-flow valve connected to a valve stem auxiliary port, such as illustrated in FIGS. 5A and 5B and disclosed in the above-mentioned U.S. Prov. Pat. App. 61/376,144 and PCT/US2011/048760, may be used to rapidly release air from tires. The post 4 may include a sleeve 40 that may be translated along the post 4 so as to cover and uncover one or more auxiliary ports 32. The sleeve may be of any suitably rigid or semi-rigid material, such as metal, plastic, rubber or ceramic. One or more seals 42 may be disposed on the stem so as to allow sealing engagement of the post 4 and sleeve 40. For example, the seals 42 may be mounted circumferentially about the inside of the sleeve 40 in suitably-dimensioned grooves 44. Alternatively, the more seals may be mounted circumferentially about post 4 in suitably-dimensioned grooves (not shown). The seals 42 may be positioned adjacent the auxiliary ports 32, and may provide a sealing interface with the sleeve 40. The seals 42 may be o-rings, lip seals or any suitable seal, and may be of any suitable material, such as nitrile or rubber. In a first position, as shown in FIGS. 5A and 5B, the sleeve 40 may cover the auxiliary ports 32, and the seals 42 may provide a sealing interface with the sleeve 40 above and below the auxiliary ports 32 so as to prevent fluid flow through the auxiliary ports 32. In a second position (not shown), the sleeve 40 may be disengaged from at least one of the seals 42 above or below the auxiliary ports 32 so as to allow fluid flow through the auxiliary ports 32.

The sleeve 40 may slideably translate from the first position to the second position, and from the second position to the first position. In one embodiment, the first position may be a default or "closed" position, and the sleeve may be biased toward the first position by a spring 46. A first end 48 of the spring 46 may be seated against a shoulder 50 of the post. A second end 52 of the spring 46 may be seated against a shoulder 54 provided on an inner surface of the sleeve 40. In a default or "closed" position of the sleeve 40, the spring 46 may be slightly compressed so as urge the sleeve 40 along the post 4 into that position. A lock ring 56 or nut may be provided about the post 4 to prevent the sleeve 40 from translating along the post 4 away from the spring 46. Thus, in a default or "closed" position of the sleeve 40, the spring 46 may urge the sleeve 40 against the lock ring 56.

The sleeve 40 may be manually translated along the post 4 from a "closed" position as shown in FIG. 4 to a second or "open" position (not shown) so as to allow fluid communication through the auxiliary ports 32, e.g., air may travel from the air channel 24 to the atmosphere, and vice versa. Translation of the sleeve 40 from the "closed" position to the "open" position may compress the spring 46 such that when the manual force against sleeve 40 is released, the sleeve 40 will translate along the post 4 back to the "closed" position.

In some embodiments, a protective skirt or bellows 58 may extend from the sleeve 40 to the first end 26 of the post 4. The bellows 58, shown in outline form in FIGS. 5A and 5B, may be of a flexible material, such as rubber, cloth or silicone. The bellows 58 may be sealed to the sleeve 40 and to the first end 26 of the post 4 to prevent contamination from collecting inside the sleeve 40 and around the spring 46.

In other embodiments, the sleeve 40 may be threadably mounted to the post 4, and may rotatably translate along the post 4 along such threads (not shown). For example, instead of using a spring 46, the post 4 may be threaded and the inside of the sleeve 40 may be threaded to allow threadable mounting of the sleeve 40 to the post 4. The threads may serve as a seal in some embodiments. If the sleeve 40 is threaded to the post 4, then the sleeve 40 may be rotated about the post 4 to effect translation of the sleeve 40 along the post 4 from the "closed" position to the "open" position, and vice versa.

In some embodiments, such as the embodiment disclosed in FIG. 6A, single tire 602 may be mounted to axle 606. A rotary air connection 608 may be mounted to the hubcap (not shown) and in fluid communication with air provided through the axle 606, as described in more detail above. A wheel mounting the tire 602 may be provided with a valve stem 610 having an auxiliary port (not shown). A first air hose 614 may connect the air connection 608 to the primary port of valve 610, and a manual pressure reduction valve 616 may be mounted to the auxiliary port of valve 610.

In some embodiments, such as the embodiment disclosed in FIG. 6B, dual tires 602, 604 may be mounted to axle 606. A rotary air connection 622 may be mounted to the hubcap (not shown) and in fluid communication with air provided through the axle 606, as described in more detail above. Each wheel mounting a tire 602, 604 may be provided with a valve stem 612, 628 having an auxiliary port (not shown). Thus, valve 628 may be mounted to the outer wheel, and valve 612 may be mounted to the inner wheel. A first air hose 624 may connect the air connection 622 to the primary port of valve 628, and a manual pressure reduction valve 626 may be mounted to the auxiliary port of valve 628. A second air hose 618 may connect the air connection 622 to the primary port of valve 612, and a manual pressure reduction valve 620 may be mounted to the auxiliary port of valve 612. To make access to the manual pressure reduction valve 620 easier to a driver, a third air hose (not shown) may be used to connect the valve 620 to the auxiliary port of valve 612. The third air hose may be long enough to allow the valve 620 to be positioned outside of the outer wheel.

In the embodiment of FIG. 7, a first air hose 702 may be connected between air connection 704 and valve 706. Valve 706 may be provided with an auxiliary port (not shown), and a second air hose 708 may connect the auxiliary port to a second valve 710. Valve 710 may be a standard valve stem, or may be a valve stem having an auxiliary port (not shown). The hose 708 may be provided with a post to hold open the valve 710 so that air may communicate back and forth between tires 712, 714 via valves 706, 710. A manual pressure reduction valve 716 may be mounted to the air connection 704 to allow a driver to deflate both tires 712, 714 on axle 718 simultaneously.

In other embodiments, the valve 710 may have an auxiliary port (not shown). Hose 702 may be connected between air connection 704 and the primary port of valve 710. The auxiliary port of valve 710 may be connected to the primary port of valve 706. The manual pressure reduction valve 716 may be mounted in the auxiliary port of valve 706 instead of mounted in air connection 704. Alternatively, a manual pressure reduction valve 716 may be mounted in the auxiliary port of valve 706 in addition to being mounted in air connection 704.

A wheel may have more than one valve stem. For example, some wheels allow for mounting two valve stems. One or the other, or both, valve stems may have an auxiliary port. In some embodiments, an air hose may be connected at one end to an air connection, and connected at the other end to a standard valve stem mounted to a wheel. A second valve stem having an auxiliary port may be mounted to the wheel, and a manual pressure reduction valve may be mounted to the auxiliary port of the second valve stem.

Figure 8:
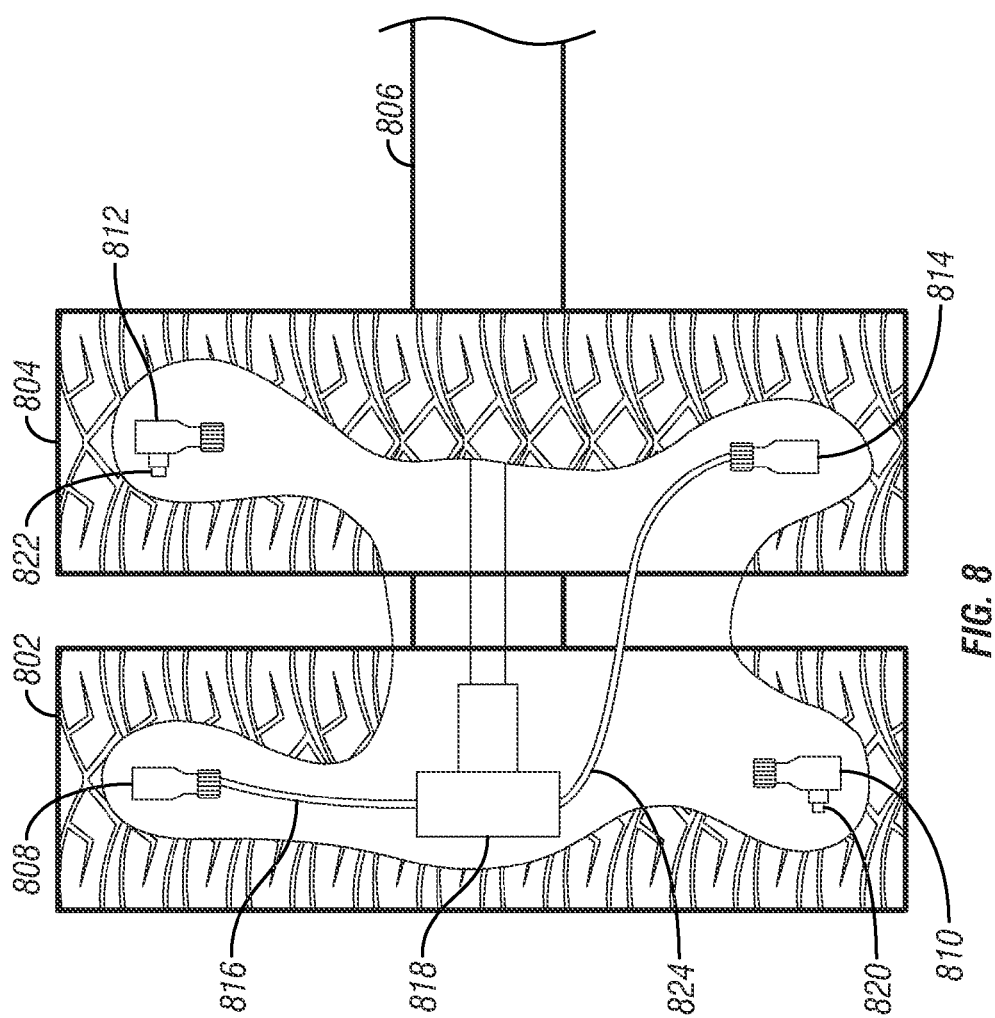
FIG. 8 illustrates an embodiment of an axle with dual tires wherein each wheel has two valves, one of which includes an auxiliary port and a pressure reduction valve.

As shown in the embodiment of FIG. 8, in embodiments in which dual tires 802, 804, each mounted to its own wheel (not shown), are mounted at one end of an axle 806, each wheel may have two valve stems 808, 810, 812, 814. An air hose 816 may be connected between air connection 818 and standard valve stem 808. A second air hose 824 may be connected between air connection 818 and a second standard valve stem 814. A first valve 810 having an auxiliary port may be mounted to the wheel of outer tire 802, and a second valve 812 having an auxiliary port may be mounted to the wheel of inner tire 804. Valve 810 may have a manual pressure reduction valve 820 mounted to its auxiliary port to allow a driver to manually release air from outer tire 802. Valve 812 may have a manual pressure reduction valve 822 mounted to its auxiliary port to allow a driver to manually release air from inner tire 804. To make access to the manual pressure reduction valve 822 easier to a driver, a third air hose (not shown) may be used to connect the valve 822 to the auxiliary port of valve 812. The third air hose may be long enough to allow the valve 822 to be positioned outside of the outer wheel.

In single-tire embodiments, such as seen in FIG. 9, a single-tire 902 may attach to axle 914 and may be provided with a standard valve stem 904 and a second valve 906 having an auxiliary port (not shown). An air hose 908 may be connected between the air connection 910 and standard valve stem 904, and a manual pressure reduction valve 912 may be provided in the auxiliary port of the second valve 906 to allow a driver to manually release air from the tire 902.

In yet further embodiments, a manual pressure reduction valve may be made part of an air hose connecting the air connection with a valve stem.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition, or matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. For example, although the disclosed apparatus, systems and methods may be described with reference to a manual or manually-activated pressure reduction valve, an electric valve or other automatic electronic or mechanical valve may be used to accomplish relatively rapid reduction of air pressure. Accordingly, the appended claims are intended to include within their scope such processes, machines, manufacture, compositions of matter, means, methods, systems or steps.

We claim:

1. A wheel end assembly, comprising a hubcap mounted to a wheel rotatable on an axle on a vehicle,
   an air pressure supply positioned inside the axle and connected to a pressure source on the vehicle,
   a rotary union mounted to the hubcap and in fluid communication with the air pressure supply,
   a valve stem mounted to the wheel, the valve stem comprising a normally-closed pressure-actuatable valve and an auxiliary port,
   an air hose connected at a first end to the rotary union and at a second end to the valve stem so as to allow air to flow from the air pressure supply through the air hose to the valve stem and through the normally-closed pressure-actuatable valve, and
   a manually-operable pressure reduction valve connected to the auxiliary port.

2. The wheel assembly of claim 1, wherein the manually-operable pressure reduction valve comprises one of a metering, timed or deceleration valve.

3. A wheel end assembly, comprising
   a hubcap mounted to a wheel rotatable on an axle on a vehicle,
   an air pressure supply positioned inside the axle and connected to a pressure source on the vehicle,
   a rotary union mounted to the hubcap and in fluid communication with the air pressure supply,
   a valve stem mounted to the wheel, the valve stem comprising a normally-closed pressure-actuatable valve,
   an air hose connected at a first end to the rotary union and at a second end to the valve stem so as to allow air to flow from the air pressure supply through the air hose to the valve stem and through the normally-closed pressure-actuatable valve, and
   a manually-operable pressure reduction valve connected to the rotary union.

4. The wheel assembly of claim 3, wherein the manually-operable pressure reduction valve comprises one of a metering, timed or deceleration valve.

5. A wheel end assembly, comprising a hubcap mounted to a wheel rotatable on an axle on a vehicle, an air pressure supply positioned inside the axle and connected to a pressure source on the vehicle, a rotary union mounted to the hubcap and in fluid communication with the air pressure supply, a first valve stem mounted to the wheel, the valve stem comprising a first normally-closed pressure-actuatable valve, a second valve stem mounted to the wheel, the second valve stem comprising a second normally-closed pressure-actuatable valve and an auxiliary port, an air hose connected at a first end to the rotary union and at a second end to the first valve stem so as to allow air to flow from the air pressure supply through the air hose to the first normally-closed pressure-actuatable valve stem, and a manually-operable pressure reduction valve connected to the auxiliary port of the second valve stem.

6. The wheel assembly of claim 5, wherein the manually-operable pressure reduction valve comprises one of a metering, timed or deceleration valve.

7. In a vehicle comprising one or more tires, an automatic tire inflation system configured to automatically inflate the one or more tires to a desired pressure upon activation, and a pressure reduction valve configured to rapidly release air from the one or more tires, a method of equalizing air pressure in vehicle tires, the method comprising:

while the automatic tire inflation system is de-activated, opening a pressure reduction valve to release air from the one or more tires at a substantially higher air flow volume than the air flow volume than the automatic tire inflation system provides for tire inflation, so as to reduce the tire pressure below a desired air pressure; and after releasing air, activating the automatic tire inflation system to substantially equally inflate the one or more tires to the desired air pressure.

8. The method of claim 7, wherein the pressure reduction valve comprises one of a metering, timed or deceleration valve.

* * * * *